(12) United States Patent
Ikeno et al.

(10) Patent No.: US 8,755,011 B2
(45) Date of Patent: Jun. 17, 2014

(54) LIQUID CRYSTAL DISPLAY DEVICE AND METHOD OF FABRICATING THE SAME

(75) Inventors: Hidenori Ikeno, Tokyo (JP); Michiaki Sakamoto, Tokyo (JP); Takahiko Watanabe, Tokyo (JP); Teruaki Suzuki, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 167 days.

(21) Appl. No.: 13/020,309

(22) Filed: Feb. 3, 2011

(65) Prior Publication Data

US 2011/0128484 A1 Jun. 2, 2011

Related U.S. Application Data

(62) Division of application No. 10/132,828, filed on Apr. 26, 2002, now Pat. No. 7,894,028.

(30) Foreign Application Priority Data

Apr. 27, 2001 (JP) ................. 2001-132744

(51) Int. Cl.
*G02F 1/1335* (2006.01)
(52) U.S. Cl.
CPC ............... *G02F 1/133555* (2013.01); *G02F 1/133553* (2013.01)
USPC .......................................... 349/114; 349/113
(58) Field of Classification Search
CPC .................. G02F 1/133553; G02F 1/133555
USPC ................. 349/113–114, 117–119, 139
See application file for complete search history.

(56) References Cited

U.S. PATENT DOCUMENTS

| 5,657,140 A | 8/1997 | Xu et al. |
| 6,141,070 A | 10/2000 | Kaneko |

(Continued)

FOREIGN PATENT DOCUMENTS

| EP | 1 072 926 | 1/2001 |
| EP | 1 111 437 | 6/2001 |

(Continued)

OTHER PUBLICATIONS

Japanese Patent Office issued a Japanese Office Action dated Jun. 30, 2010, Application No. 2001-132744.

*Primary Examiner* — Dung Nguyen
(74) *Attorney, Agent, or Firm* — Young & Thompson

(57) ABSTRACT

A liquid crystal display device includes a first substrate, a second substrate, and a liquid crystal layer sandwiched between the first and second substrates. The first substrate includes first to N-th 1st retardation plates arranged on the first transparent substrate, and the second substrate includes first to N-th 2nd retardation plates arranged on the second transparent substrate. Assuming that a retardation plate among the first to N-th 1st retardation plates has an optical axis arranged at a first angle relative to a reference direction and a retardation plate among the first to N-th 2nd retardation plates, corresponding to the retardation plate among the first to N-th 1st retardation plates, has an optical axis arranged at a second angle relative to the reference direction, the first and second angles are different from each other by about 90 degrees.

5 Claims, 12 Drawing Sheets

(56) References Cited

U.S. PATENT DOCUMENTS

| | | | |
|---|---|---|---|
| 6,195,140 B1 | 2/2001 | Kubo et al. | |
| 6,295,109 B1 | 9/2001 | Kubo et al. | |
| 6,552,767 B1 | 4/2003 | Kaneko | |
| 6,570,634 B2 * | 5/2003 | Kim | 349/114 |
| 6,657,689 B2 | 12/2003 | Baek | |
| 6,825,902 B2 | 11/2004 | Kaneko | |
| 6,922,222 B2 | 7/2005 | Miyachi et al. | |
| 6,937,304 B2 * | 8/2005 | Ha et al. | 349/114 |
| 7,088,411 B2 * | 8/2006 | Allen et al. | 349/121 |
| 7,593,075 B2 * | 9/2009 | Kudou et al. | 349/114 |
| 2001/0055082 A1 | 12/2001 | Kubo et al. | |

FOREIGN PATENT DOCUMENTS

| | | |
|---|---|---|
| JP | 11-101992 | 4/1999 |
| JP | 2955277 | 7/1999 |
| JP | 11-281992 | 10/1999 |
| JP | 11-311780 | 11/1999 |
| JP | 20000-35570 | 2/2000 |
| JP | 2000-258769 | 9/2000 |
| JP | 2000-275660 | 10/2000 |
| WO | 99/40480 | 8/1999 |
| WO | 00/48039 | 8/2000 |
| WO | 00/75718 | 12/2000 |

* cited by examiner

Luminance

LIGHT TRANSMISSION RATES ( R. G. B )

LIQUID CRYSTAL DISPLAY DEVICE AND METHOD OF FABRICATING THE SAME

CROSS REFERENCE TO RELATED APPLICATIONS

This application is a new division of co-pending application Ser. No. 10/132,828 filed on Apr. 26, 2002, which claims priority to Japanese Application No. 2001-132744 filed on Apr. 27, 2001. The entire contents of each of the above-identified applications are hereby incorporated by reference.

BACKGROUND OF THE INVENTION

1. Field of the Invention

The invention relates to a liquid crystal display device having an area through which a light is allowed to pass for forming images on a screen, and an area in which a light is reflected for forming images on a screen.

2. Description of the Related Art

A liquid crystal display device has advantages that it is thin, and it consumes small power. Due to the advantages, a liquid crystal display device is widely used, for instance, for a monitoring screen in various displays.

Unlike a cathode ray tube (CRT) and an electroluminescence (EL) display device, a liquid crystal display device does not have a function of emitting a light. Hence, a liquid crystal display device is necessary to have a light source separately from a monitoring screen. In dependence on a type of a light source, a liquid crystal display device is grouped into a light transmission type liquid crystal display device and a light reflection type liquid crystal display device.

A light transmission type liquid crystal display device includes a light source at a rear, and display images by switching transmission and interruption of a light (which is called "backlight") emitted from the light source.

In a light transmission type liquid crystal display device, power consumed for emitting a backlight is 50% or greater in total power consumption. That is, a light source for emitting a backlight causes much power consumption in a light transmission type liquid crystal display device.

In order to solve such a disadvantage of a light transmission type liquid crystal display device as mentioned above, there has been suggested a light reflection type liquid crystal display device.

A light reflection type liquid crystal display device includes a light-reflection plate at which surrounding lights are reflected. Images are displayed on a screen by switching transmission and interruption of lights having been reflected from the light-reflection plate. Unlike a light transmission type liquid crystal display device, a light reflection type liquid crystal display device is not necessary to include a light source, and hence, can reduce power consumption in comparison with a light transmission type liquid crystal display device.

For instance, a handy communication device such as a cellular phone is frequently used outside, and hence, can use surrounding lights as reflected lights. For that reason, a light reflection type liquid crystal display device is suitable to a monitoring screen of a handy communication device.

However, a light reflection type liquid crystal display device which uses surrounding lights as reflected lights is accompanied with a problem that if surrounding lights are not bright, a user cannot clearly look at a screen.

On the other hand, contrary to a light reflection type liquid crystal display device, a light transmission type liquid crystal display device is accompanied with a problem that if surrounding lights are extremely bright, images displayed on a screen look dark in comparison with the surrounding lights.

In order to solve those problems, there has been suggested a light reflection and transmission type liquid crystal display device which accomplish both displaying images by partially transmitting a light and displaying images by partially reflecting a light, in a single liquid crystal display panel.

As an example, a light reflection and transmission type liquid crystal display device suggested in Japanese Patent No. 2955277 (B2) (Japanese Unexamined Patent Publication No. 11-101992 (A)) is illustrated in FIG. 1.

The illustrated liquid crystal display device is comprised of an active matrix substrate 100, an opposing substrate 110 facing the active matrix substrate 100, and a liquid crystal layer 120 sandwiched between the active matrix substrate 100 and the opposing substrate 110.

The active matrix substrate 100 is comprised of a first transparent substrate 101, a retardation plate 102 formed on the first transparent substrate 101 at the opposite side of the liquid crystal layer 120, and a polarizer 103 formed on the retardation plate 102.

A backlight source 104 is arranged below the polarizer 103.

The opposing substrate 110 is comprised of a second transparent substrate 111, a retardation plate 112 formed on the second transparent substrate 111, and a polarizer 113 formed on the retardation plate 112.

The first transparent substrate 101 has a first area A in which a light emitted from the backlight source 104 transmits through the active matrix substrate 100, the liquid crystal layer 120 and the opposing substrate 110, and a second area B in which an incoming light is reflected.

An electrically conductive transparent film 105 is formed on the first transparent substrate 101 in the first area A.

An electrically insulating film 106 having raised and recessed portions, and a light-reflection plate 107 covering the electrically insulating film 106 therewith are formed on the first transparent substrate 101 in the second area B.

A light 130 having been emitted from the backlight source 104 passes through the electrically conductive transparent film 105 for forming certain images on a liquid crystal display panel. A light 140 externally entering the liquid crystal display device is reflected at the light-reflection plate 107 for forming certain images on a liquid crystal display panel.

The retardation plates 102 and 112 provide retardation of a quarter length ($\lambda/4$) to such a transmission light and a reflected light. A transmission light and a reflected light are converted into a linearly polarized light from a circularly polarized light or vice versa, when they pass through the polarizers 103 and 113.

As illustrated in FIG. 1, the electrically insulating film 106 is not formed below the electrically conductive transparent film 105. Hence, it would be possible to equalize an optical length of a light in the liquid crystal layer 120 which light passes through the liquid crystal layer 120 in reciprocation in the second area B, and an optical length of a light in the liquid crystal layer 120 which light passes through the liquid crystal layer 120 in the first area A, to each other by designing a cell gap in the first area A, that is, a thickness Df of the liquid crystal layer 120 to be greater than a cell gap Dr in the second area B. As a result, it would be possible to control optical characteristics of lights passing through the liquid crystal layer 120 in the first area A and in the second area B such that the optical characteristics vary in the same manner.

However, the conventional liquid crystal display device illustrated in FIG. 1 is accompanied with a problem that if characteristics of displaying images through reflected lights are optimized, a luminance would be lowered, because the cell gap Df in the first area A is greater than the cell gap Dr in the second area B. This is because a twisting angle of liquid crystal is equal to about 72 degrees, if the above-mentioned characteristics are optimized, and an intensity of a transmission light is lowered at a twisting angle of about 72 degrees under the condition of Df<Dr.

Japanese Unexamined Patent Publication No. 2000-258769 (A) has suggested a liquid crystal display device including a first polarizer, a second polarizer, a liquid crystal device sandwiched between the first and second polarizers, a retardation plate arranged between the second polarizer and the liquid crystal device, and a light source arranged on the second polarizer at the opposite side of the retardation plate. The liquid crystal device is a transmission and reflection type device, and is comprised of a first light-permeable substrate arranged on the first polarizer, a second substrate arranged on the retardation plate and having a light-reflection area and a light-transmission area, and a liquid crystal layer which is arranged between the first and second substrates, is horizontally aligned, and has positive dielectric anisotropy. The retardation plate compensates for a viewing angle, and has an index ellipsoid having a main index of refraction inclining relative to a normal line of the second substrate.

However, the above-mentioned problems remain unsolved even in the liquid crystal display device suggested in the Publication.

SUMMARY OF THE INVENTION

In view of the above-mentioned problems in the conventional liquid crystal display devices, it is an object of the present invention to provide a light-transmission and light-reflection type liquid crystal display device which is capable of avoiding reduction in a bright when used as a light-transmission type liquid crystal display device, and enhancing both a contrast and a luminance, when used as a light-reflection type liquid crystal display device.

It is also an object of the present invention to provide a method of fabricating such a light-transmission and light-reflection type liquid crystal display device.

In one aspect of the present invention, there is provided a liquid crystal display device including (a) a first substrate, (b) a second substrate spaced away from and facing the first substrate, and (c) a liquid crystal layer sandwiched between the first and second substrates. The first substrate being comprised of (a1) a first transparent substrate having a first area through which a light is allowed to pass and a second area in which a light is reflected, (a2) first to N-th 1st retardation plates arranged on the first transparent substrate at the opposite side of the liquid crystal layer wherein a K-th 1st retardation plate is closer to the first transparent substrate than a (K+1)-th 1st retardation plate, and wherein N is an integer equal to or greater than 1, and K is an integer equal to or greater than 1, and (a3) a first polarizer arranged on the N-th 1st retardation plate. The second substrate being comprised of (b1) a second transparent substrate, (b2) first to N-th 2nd retardation plates arranged on the second transparent substrate at the opposite side of the liquid crystal layer wherein a K-th 2nd retardation plate is closer to the second transparent substrate than a (K+1)-th 2nd retardation plate, and wherein N is an integer equal to or greater than 1, and K is an integer equal to or greater than 1, and (b3) a second polarizer arranged on the N-th 2nd retardation plate. A retardation plate among the first to N-th 1st retardation plates has an optical axis arranged at a first angle relative to a reference direction and a retardation plate among the first to N-th 2nd retardation plates, corresponding to the retardation plate among the first to N-th 1st retardation plates, has an optical axis arranged at a second angle relative to the reference direction, the first and second angles are different from each other by about 90 degrees.

It is preferable that a retardation plate arranged closest to the first transparent substrate among the first to N-th 1st retardation plates has retardation in the range of 140 nm to 160 nm, and a retardation plate arranged remotest from the second transparent substrate among the first to N-th 2nd retardation plates has retardation in the range of 250 nm to 300 nm.

It is preferable that a retardation plate arranged closest to the first transparent substrate among the first to N-th 1st retardation plates is arranged at an angle in the range of 90 to 120 degrees relative to a reference direction, a retardation plate arranged remotest from the first transparent substrate among the first to N-th 1st retardation plates is arranged at an angle in the range of 150 to 180 degrees relative to the reference direction, and the first polarizer is arranged at an angle in the range of −15 to 15 degrees relative to the reference direction, and that a retardation plate arranged closest to the second transparent substrate among the first to N-th 2nd retardation plates is arranged at an angle in the range of 0 to 30 degrees relative to the reference direction, a retardation plate arranged remotest from the second transparent substrate among the first to N-th 2nd retardation plates is arranged at an angle in the range of 60 to 90 degrees relative to the reference direction, and the second polarizer is arranged at an angle in the range of 75 to 105 degrees relative to the reference direction.

It is preferable that a retardation plate arranged closest to the first transparent substrate among the first to N-th 1st retardation plates is arranged at an angle in the range of −20 to 10 degrees relative to a reference direction, a retardation plate arranged remotest from the first transparent substrate among the first to N-th 1st retardation plates is arranged at an angle in the range of 95 to 125 degrees relative to the reference direction, and the first polarizer is arranged at an angle in the range of −15 to 15 degrees relative to the reference direction, and that a retardation plate arranged closest to the second transparent substrate among the first to N-th 2nd retardation plates is arranged at an angle in the range of 0 to 30 degrees relative to the reference direction, a retardation plate arranged remotest from the second transparent substrate among the first to N-th 2nd retardation plates is arranged at an angle in the range of 60 to 90 degrees relative to the reference direction, and the second polarizer is arranged at an angle in the range of 75 to 105 degrees relative to the reference direction.

It is preferable that a retardation plate arranged closest to the first transparent substrate among the first to N-th 1st retardation plates is arranged at an angle in the range of 75 to 105 degrees relative to a reference direction, a retardation plate arranged remotest from the first transparent substrate among the first to N-th 1st retardation plates is arranged at an angle in the range of 135 to 165 degrees relative to the reference direction, and the first polarizer is arranged at an angle in the range of 150 to 180 degrees relative to the reference direction, and that a retardation plate arranged closest to the second transparent substrate among the first to N-th 2nd retardation plates is arranged at an angle in the range of −15 to 15 degrees relative to the reference direction, a retardation plate arranged remotest from the second transparent substrate among the first to N-th 2nd retardation plates is arranged at an angle in the range of 45 to 75 degrees relative to the reference direction, and the second polarizer is arranged at an angle in the range of 60 to 90 degrees relative to the reference direction.

For instance, a thickness of the liquid crystal layer in the first area may be almost equal to a thickness of the liquid crystal layer in the second area. As an alternative, a thickness of the liquid crystal layer in the first area may be smaller than a thickness of the liquid crystal layer in the second area.

There is further provided a liquid crystal display device including (a) a first substrate, (b) a second substrate spaced away from and facing the first substrate, and (c) a liquid crystal layer sandwiched between the first and second substrates. The first substrate is comprised of (a1) a first transparent substrate having a first area through which a light is allowed to pass and a second area in which a light is reflected, (a2) first to N-th 1st retardation plates arranged on the first transparent substrate at the opposite side of the liquid crystal layer wherein a K-th 1st retardation plate is closer to the first transparent substrate than a (K+1)-th 1st retardation plate, and wherein N is an integer equal to or greater than 1, and K is an integer equal to or greater than 1, and (a3) a first polarizer arranged on the N-th 1st retardation plate. The second substrate is comprised of (b1) a second transparent substrate, (b2) first to N-th 2nd retardation plates arranged on the second transparent substrate at the opposite side of the liquid crystal layer wherein a K-th 2nd retardation plate is closer to the second transparent substrate than a (K+1)-th 2nd retardation plate, and wherein N is an integer equal to or greater than 1, and K is an integer equal to or greater than 1, and (b3) a second polarizer arranged on the N-th 2nd retardation plate. A retardation plate arranged closest to the first transparent substrate among the first to N-th 1st retardation plates has retardation in the range of 125 nm to 155 nm, and a retardation plate arranged remotest from the second transparent substrate among the first to N-th 2nd retardation plates has retardation in the range of 250 nm to 300 nm, and a retardation plate arranged closet to the second transparent substrate among the first to N-th 2nd retardation plates has retardation in the range of 140 nm to 170 nm. Assuming that a retardation plate among the second to N-th 1st retardation plates has an optical axis arranged at a first angle relative to a reference direction and a retardation plate among the second to N-th 2nd retardation plates, corresponding to the retardation plate among the second to N-th 1st retardation plates, has an optical axis arranged at a second angle relative to the reference direction, the first and second angles are different from each other by about 90 degrees.

There is still further provided a liquid crystal display device including (a) a first transparent substrate, (b) a second substrate spaced away from and facing the first transparent substrate, and (c) a liquid crystal layer sandwiched between the first transparent substrate and the second substrate, wherein the first transparent substrate has a first area through which a light is allowed to pass and a second area in which a light is reflected, a reflection electrode is formed in the second area, the reflection electrode being comprised of an underlying film formed on an electrically insulating film and composed of one of molybdenum, chromium, titanium and tantalum, and an overlying film formed on the underlying film and composed of one of aluminum and silver, a transmission electrode is formed on the electrically insulating film in the first area, the reflection electrode partially overlaps the transmission electrode at their ends such that the reflection electrode is located on the transmission electrode.

For instance, the electrically insulating film is an organic film, the underlying film has a thickness in the range of 100 to 3000 angstroms, and the overlying film has a thickness in the range of 500 to 5000 angstroms.

It is preferable that there is a first portion where the transmission electrode overlaps the underlying film, but does not overlap the overlying film between a second portion where the transmission electrode overlaps the reflection electrode and a third portion the transmission electrode does not overlap the underlying film, in a top view of a portion at which the transmission electrode connects to the reflection electrode.

It is preferable that the electrically insulating film formed in the second area is formed at a surface thereof with raised and recessed portions.

It is preferable that the electrically insulating film formed in first area has a planarized surface.

It is preferable that the second portion is in a tapered form, and the first portion has a thickness equal to or greater than 0.5 micrometers.

In another aspect of the present invention, there is provided an electronic device including a liquid crystal display device as defined above.

In still another aspect of the present invention, there is provided a method of fabricating a liquid crystal display device including (a) a first transparent substrate having a first area through which a light is allowed to pass and a second area in which a light is reflected, (b) a second substrate spaced away from and facing the first transparent substrate, and (c) a liquid crystal layer sandwiched between the first transparent substrate and the second substrate, the method including the steps of (a) forming an electrically insulating film which has raised and recessed portions at a surface in the second area, and has a planarized surface in the first area, (b) forming a transparent electrode on the electrically insulating film in the first area, (c) forming an underlying film and an overlying film entirely over the first transparent substrate, the overlying film being composed of aluminum or silver, and (d) patterning the both underlying and overlying films, the transparent electrode being electrically connected to the overlying film through the underlying film.

The advantages obtained by the aforementioned present invention will be described hereinbelow.

In accordance with the above-mentioned liquid crystal display device, it would be possible to use twist nematic liquid crystal which has a wide gap margin and is capable of accomplishing high white-colored display, when images are displayed through reflected lights, and to display images vividly in high contrast, when images are displayed through transmitted lights.

The reason is as follows.

When a liquid crystal device used for a light-reflection panel is designed, any angle other than 90 degrees is selected, taking into consideration display characteristics in displaying images through reflected lights. However, even if a voltage is applied to liquid crystal molecules, liquid crystal molecules existing in the vicinity of upper and lower substrates do not rise up at a twisting angle other than 90 degrees, resulting in that high contrast cannot be obtained due to existence of residual birefringence.

The liquid crystal display device in accordance with the present invention increases birefringence of the first retardation plate to thereby make the 1st retardation plates in parallel with a residual birefringence ellipsoid, and remove the residual retardation. In addition, combination of the 1st and 2nd retardation plates would compensate for retardation in a wide range, and present a high contrast ratio.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
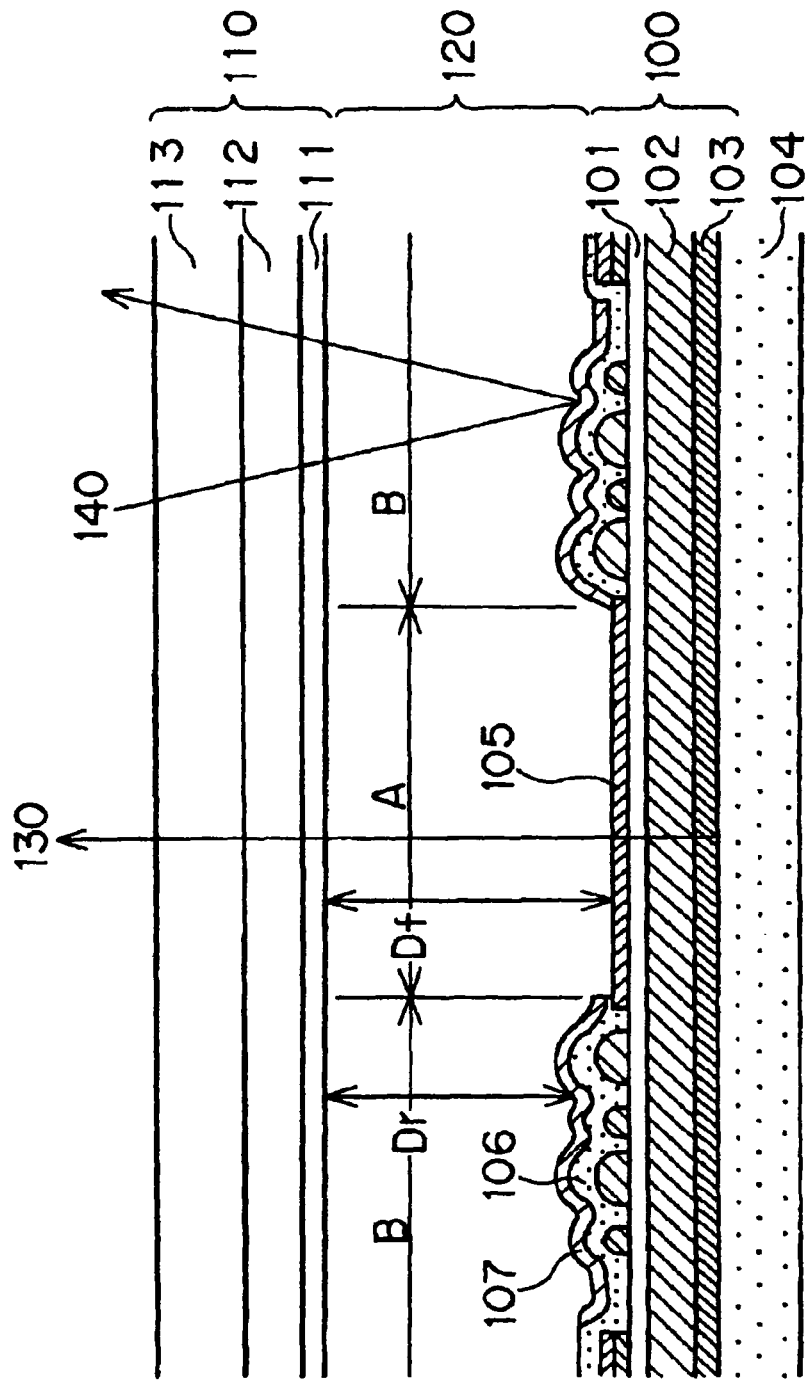
FIG. 1 is a cross-sectional view of a conventional liquid crystal display device.
Figure 2:
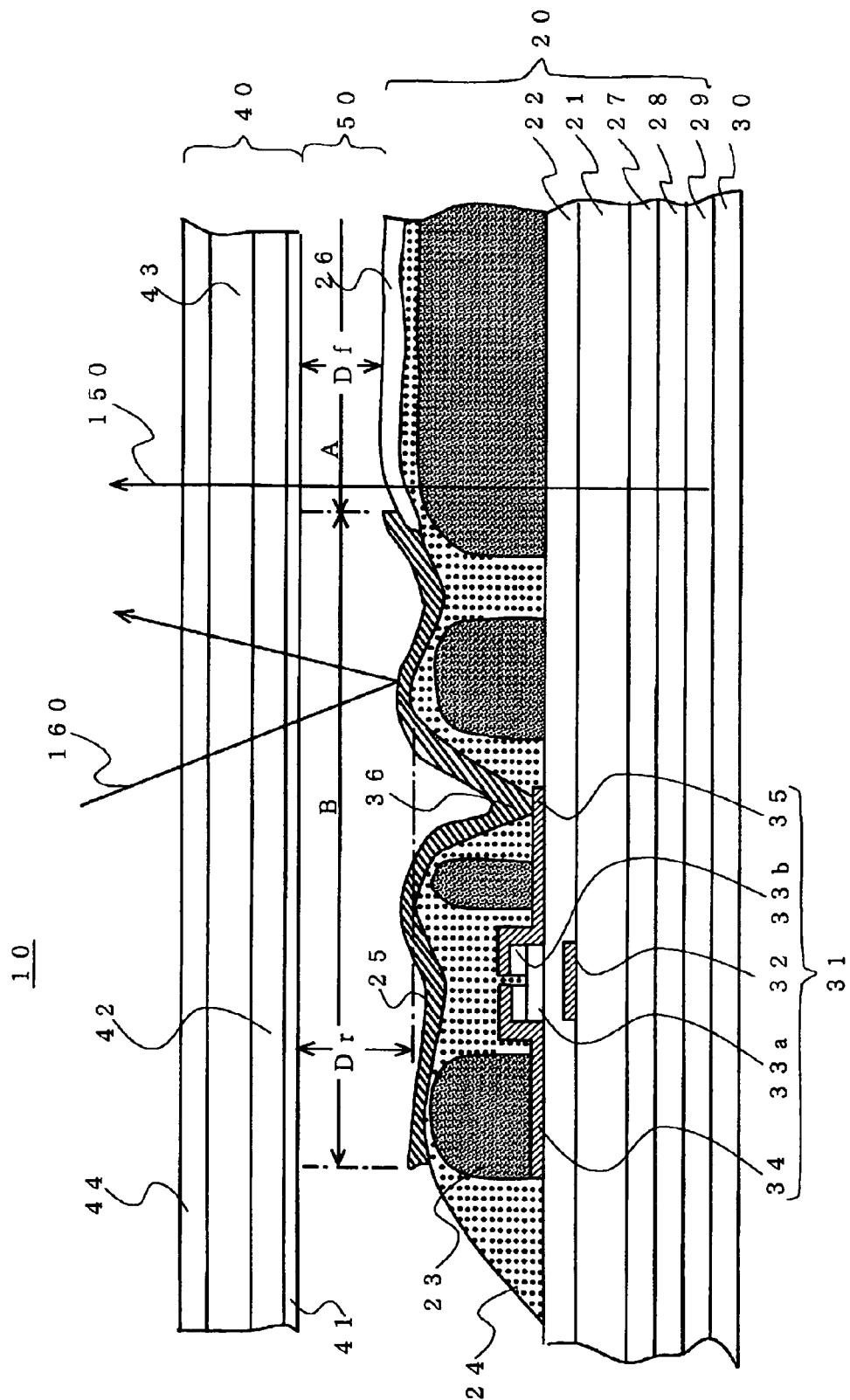
FIG. 2 is a cross-sectional view of a liquid crystal display device in accordance with the first embodiment of the present invention.

FIG. 2 is a cross-sectional view of a liquid crystal display device 10 in accordance with the first embodiment.

The liquid crystal display device 10 in accordance with the first embodiment is comprised of an active matrix substrate 20, an opposing substrate 40 facing the active matrix 20, a liquid crystal layer 50 sandwiched between the active matrix substrate 20 and the opposing substrate 40, and a backlight source 30 arranged below the active matrix substrate 20.

The active matrix substrate 20 is comprised of a first transparent substrate 21, a gate insulating film 22 formed on the first transparent substrate 21, a first electrically insulating film 23 formed on the gate insulating film 22, a second electrically insulating film 24 formed on the gate insulating film 22 to cover the first electrically insulating film 23 therewith, a light-reflection electrode 25 formed on the second electrically insulating film 24, a transparent electrode 26 formed on the second electrically insulating film 24 such that the transparent electrode 26 partially overlaps the light-reflection electrode 25, a thin film transistor 31 formed on the first transparent substrate 21, a first 1st retardation plate 27 formed on the first transparent substrate 21 at the opposite side of the liquid crystal layer 50, a second 1st retardation plate 28 formed on the first 1st retardation plate 27, and a first polarizer 29 formed on the second 1st retardation plate 28.

The backlight source 30 is arranged immediately below the first polarizer 29.

The opposing substrate 40 is comprised of a second transparent substrate 41, a first 2nd retardation plate 42 formed on the second transparent substrate 41, a second 2nd retardation plate 43 formed on the first 2nd retardation plate 42, and a second polarizer 44 formed on the second 2nd retardation plate 43.

The opposing substrate 40 further includes a transparent electrode (not illustrated) and an alignment film (not illustrated) formed on the second transparent substrate 41 in contact with the liquid crystal layer 50.

The active matrix substrate 20 further includes an alignment film (not illustrated) formed on both the light-reflection electrode 25 and the transparent electrode 26 in contact with the liquid crystal layer 50.

The active matrix substrate 20 has a first area A through which a light is allowed to pass, and a second area B in which an incoming light is reflected. The light-reflection electrode 25 is formed in the second area B, and the transparent electrode 26 is formed in the first area A.

In the second area B, the first electrically insulating film 23 is formed in spots in the form of a projection, and the second electrically insulating film 24 covering the first electrically insulating film therewith is formed to have raised and recessed portions. In the first area A, the first electrically insulating film 23 is planarized. Hence, in the second area B, the light-reflection electrode 25 formed on the second electrically insulating film 24 also has raised and recessed portions, and, in the first area A, the transparent electrode 26 formed on the second electrically insulating film 24 is also planarized.

The structure of the liquid crystal display device in accordance with the first embodiment is not to be limited to the structure illustrated in FIG. 2. For instance, the first electrically insulating film 23 may be formed in spots in the form of a projection, and the second electrically insulating film 24 covering the first electrically insulating film 23 therewith may be formed to have raised and recessed portions also in the first area A, similarly to the second area B.

The first electrically insulating film 23 may be planarized, and the second electrically insulating film 24 may be planarized also in the second area B, in which case, reflected lights are scattered by the opposing substrate 40.

A light emitted from the backlight source 30 passes through the first area A to thereby display certain images on a liquid crystal panel. An incident light 160 entering the liquid crystal display device 10 from outside is reflected at the light-reflection electrode 25 to there by display certain images on a liquid crystal panel.

The thin film transistor 31 is comprised of a gate electrode 32 formed on the first transparent substrate 21, an amorphous silicon (a-Si) layer 33a formed on the gate insulating film 22 above the gate electrode 32, an n+ amorphous silicon (a-Si) layer 33b formed partially on the a-Si layer 33a, a drain electrode 34 formed on the gate insulating film 22 covering the n+ a-Si layer 33b and the a-Si layer 33a therewith, and a source electrode 35 formed on the gate insulating film 22 covering the n+ a-Si layer 33b and the a-Si layer 33a therewith.

The light-reflection electrode 25 makes electrical contact with the source electrode 35 at a contact 36.

The first 1st retardation plate 27 has retardation of 140 nm, and the second 1st retardation plate 28 has retardation of 250 nm.

The first 1st retardation plate 27 may have retardation in the range of 135 nm to 160 nm, and the second 1st retardation plate 28 may have retardation in the range of 250 nm to 300 nm.

Figure 3:
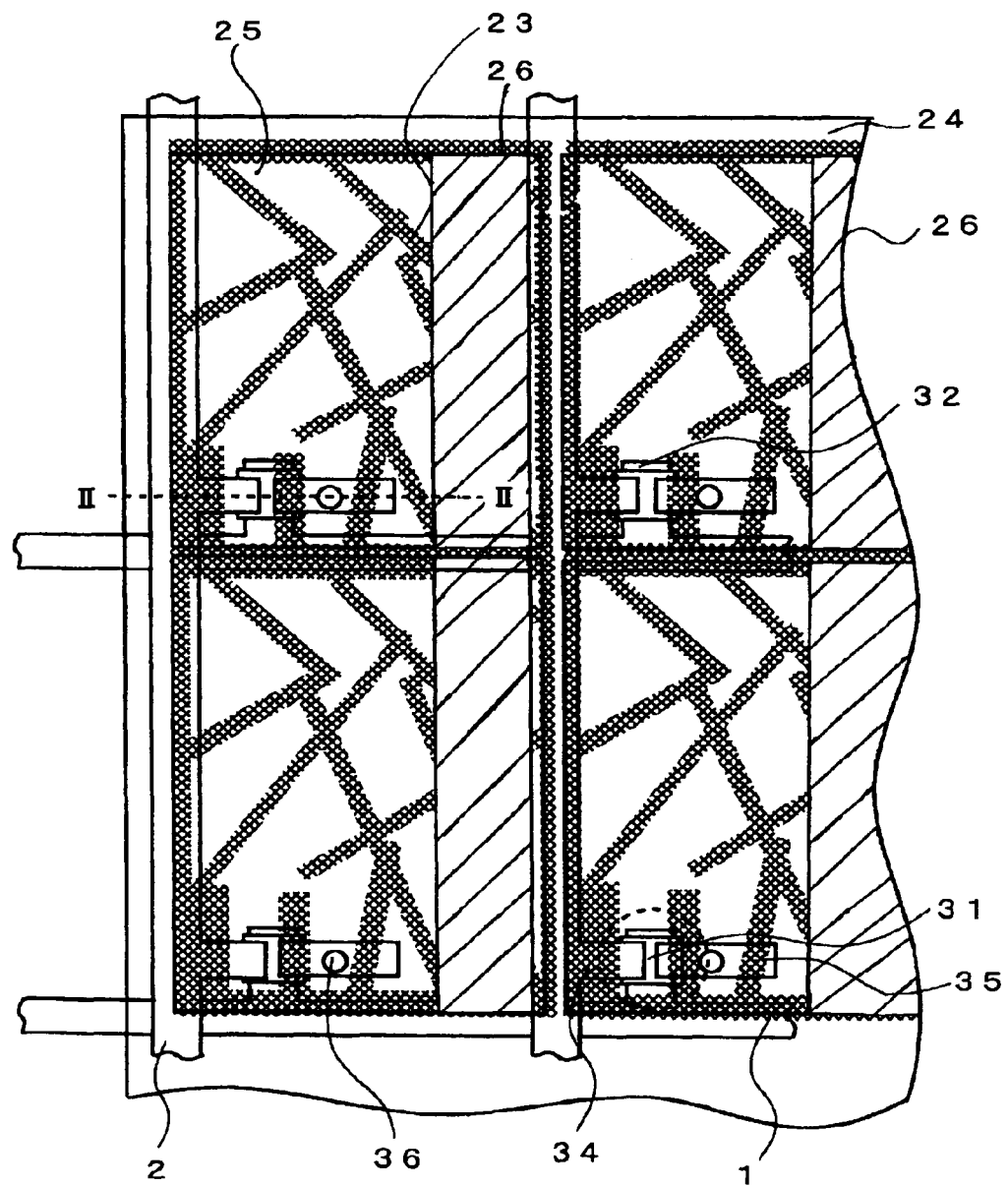
FIG. 3 is a top plan view of the liquid crystal display device illustrated in FIG. 2.

FIG. 3 is a top plan view of the liquid crystal display device 10 in accordance with the first embodiment. FIG. 2 corresponds to a cross-sectional view taken along the line II-II in FIG. 3.

As illustrated in FIG. 3, the active matrix substrate 20 includes gate lines 1 and drain lines 2 extending perpendicularly to each other. The thin film transistor 31 as a switching device is arranged in each of pixels defined by the gate lines 1 and the drain lines 2.

The light-reflection electrode 25 reflects a light entering each of pixels. A voltage is applied to the liquid crystal layer 50 sandwiched between the active matrix substrate 20 and the opposing substrate 40, through the light-reflection electrode 25.

The transparent electrode 26 formed adjacent to the light-reflection electrode 25 allows a light emitted from the backlight source 30 to pass therethrough.

The gate electrode 32 is electrically connected to the gate lines 1, the drain electrode 34 is electrically connected to the drain lines 2, and the source electrode 35 is electrically connected to the light-reflection electrode 25.

Assuming that the first 1st retardation plate 27 has an optical axis arranged at a first angle relative to a reference direction, the first 2nd retardation plate 42 has an optical axis arranged at a second angle relative to the reference direction, the first and second angles are deviated from each other by about 90 degrees. Similarly, assuming that the second 1st retardation plate 28 has an optical axis arranged at a third angle relative to a reference direction, the second 2nd retardation plate 43 has an optical axis arranged at a fourth angle relative to the reference direction, the third and fourth angles are deviated from each other by about 90 degrees.

Hereinbelow, an angle at which an optical axis of a retardation plate is arranged relative to a reference direction is referred to as an arrangement angle.

Specifically, assuming that first to N-th 1st retardation plates are formed on the first transparent substrate 21 such that a K-th 1st retardation plate is located closer to the first transparent substrate 21 than a (K+1)-th 1st retardation plate wherein K is an integer equal to or greater than one, but equal to or smaller than (N−1), and that first to N-th 2nd retardation plates are formed on the second transparent substrate 41 such that a K-th 1st retardation plate is located closer to the second transparent substrate 41 than a (K+1)-th 1st retardation plate, a K-th 1st retardation plate corresponds to a K-th 2nd retardation plate, and angles of the corresponding 1st and 2nd retardation plates at which optical axes thereof are arranged relative to a reference direction are deviated from each other by about 90 degrees.

In the examples explained hereinbelow, a reference direction is defined as a direction perpendicular to a direction in which liquid crystal molecules existing at the middle in a thickness-wise direction of the liquid crystal layer 50 are aligned, and a direction in which liquid crystal molecules in the liquid crystal layer 50 are twisted starting from the opposing substrate 40 towards the active matrix substrate 20 is defined as a positive twisting direction.

In the first example, in the second area B, the first 2nd retardation plate 42, the second 2nd retardation plate 43 and the second polarizer 44 are designed to have retardation and arrangement angle in accordance with Japanese Patent Application No. 2001-022485 suggesting a light-reflection type liquid crystal display device which is capable of avoiding displayed images from being colored when a black is displayed, and presenting high contrast to displayed images.

It should be noted that the reference to Japanese Patent Application No. 2001-022485 does not mean that the applicant admits the Patent Application as statutory prior art. Japanese Patent Application No. 2001-022485 is referred to only for the purpose of better understanding of the present invention.

Then, there are prepared retardation plates having the same retardation as those of the first 2nd retardation plate 42, the second 2nd retardation plate 43 and the second polarizer 44, as the first 1st retardation plate 27, the second 1st retardation plate 28 and the first polarizer 29, respectively, all of which are influenced by the first area A. The arrangement angles between those corresponding retardation plates and polarizers are designed to be deviated from each other by about 90 degrees.

Figure 4A:
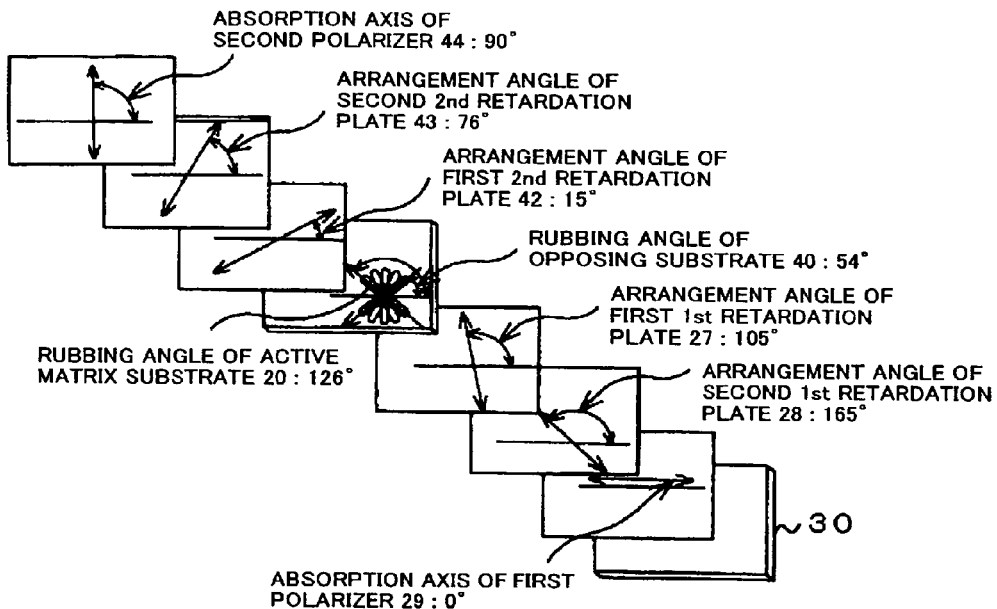
FIG. 4A illustrates a first example of a relation among arrangement angles of the retardation plates in the liquid crystal display device illustrated in FIG. 2.

FIG. 4A illustrates the first example showing a relation between the arrangement angles of the first 1st retardation plate 27 and the first 2nd retardation plate 42 and further between the arrangement angles of the second 1st retardation plate 28 and the second 2nd retardation plate 43.

Figure 4B:
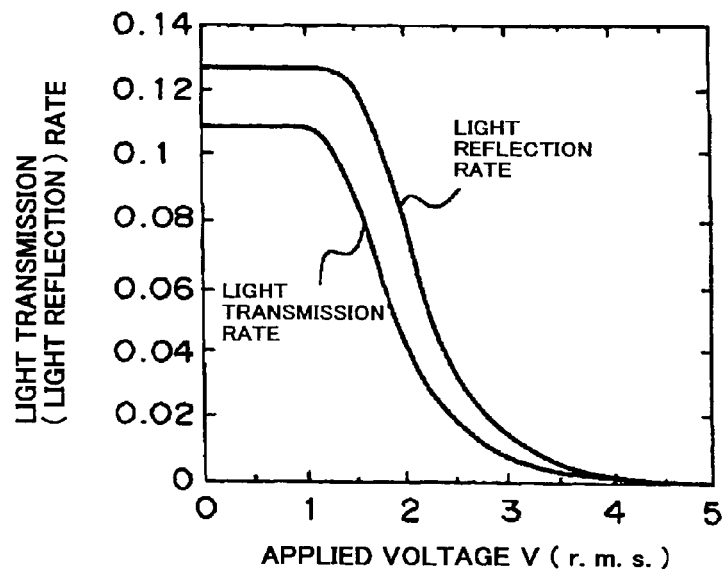
FIG. 4B is a graph showing a relation between a transmission or reflection rate and a voltage to be applied to liquid crystal in the liquid crystal display device illustrated in FIG. 4A.

FIG. 4B is a graph showing a relation between a voltage to be applied to liquid crystal and a light transmission rate (or a light reflection rate) in the first example.

As illustrated in FIG. 4A, in the first example, the first polarizer 29 has an absorption axis inclining by 0 degrees relative to the reference direction, and the second polarizer 44 has an absorption axis inclining by 90 degrees relative to the reference direction.

The active matrix substrate 20 has a rubbing angle of 126 degrees, and the opposing substrate 40 has a rubbing angle of 54 degrees.

In the first example, the first 1st retardation plate 27 and the first 2nd retardation plate 42 are comprised of a retardation plate having retardation of about a quarter wavelength ($\lambda/4$), whereas the second 1st retardation plate 28 and the second 2nd retardation plate 43 are comprised of a retardation plate having retardation of about a half wavelength ($\lambda/2$).

The first 1st retardation plate 27 has an arrangement angle of 105 degrees. The first 2nd retardation plate 42 corresponding to the first 1st retardation plate 27 has an arrangement angle of 15 degrees. Thus, the arrangement angles between the first 1st retardation plate 27 and the first 2nd retardation plate 42 are deviated from each other by 90 degrees.

The second 1st retardation plate 28 has an arrangement angle of 165 degrees. The second 2nd retardation plate 43 corresponding to the second 1st retardation plate 28 has an arrangement angle of 76 degrees. Thus, the arrangement angles between the second 1st retardation plate 28 and the second 2nd retardation plate 43 are deviated from each other by about 90 degrees (accurately, 89 degrees).

There was fabricated a liquid crystal display device including the first 1st retardation plate 27, the second 1st retardation plate 28, the first 2nd retardation plate 42 and the second 2nd retardation plate 43 all having the above-mentioned relation with respect to the arrangement angle, and a contrast ratio was measured when images were displayed through transmission lights having passed through the first area A.

The measured contrast ratio was 105.

The measured contrast ratio is an improved one in comparison with a contrast ratio in a conventional liquid crystal display device which contrast ratio is equal to or smaller than 100.

Figure 5A:
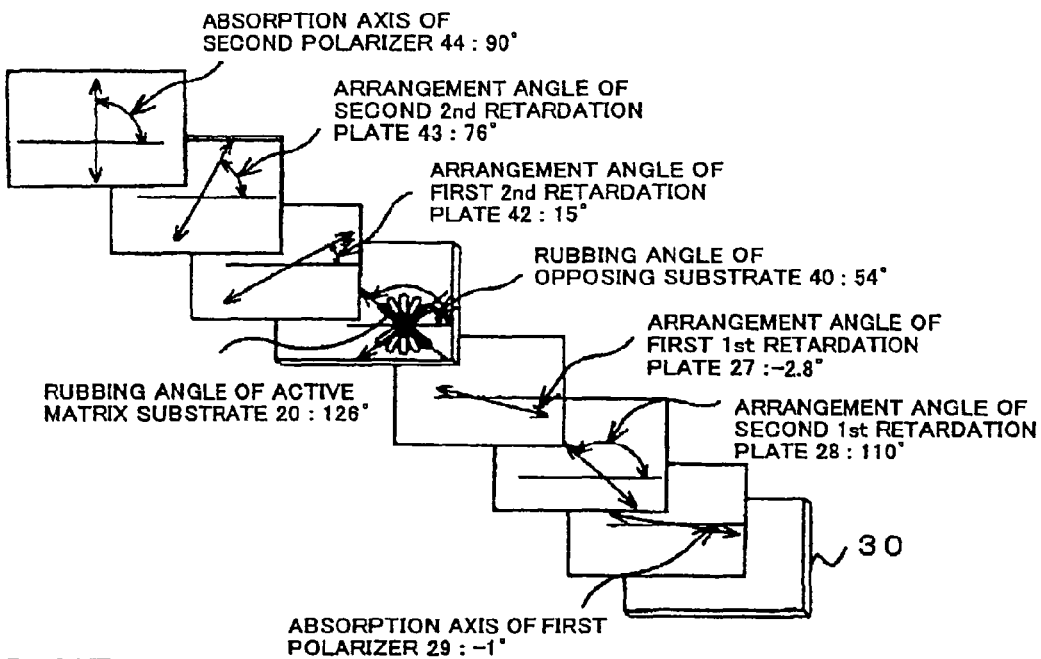
FIG. 5A illustrates a second example of a relation among arrangement angles of the retardation plates in the liquid crystal display device illustrated in FIG. 2.

FIG. 5A illustrates the second example showing a relation between the arrangement angles of the first 1st retardation plate 27 and the first 2nd retardation plate 42 and further between the arrangement angles of the second 1st retardation plate 28 and the second 2nd retardation plate 43.

Figure 5B:
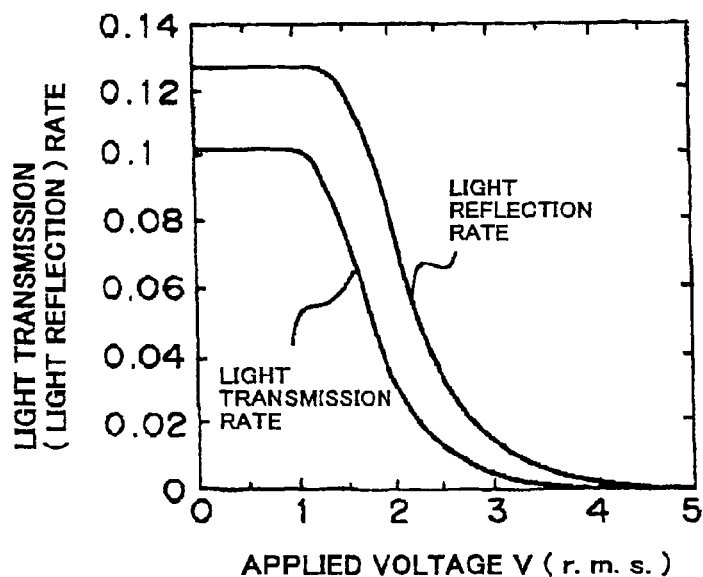
FIG. 5B is a graph showing a relation between a transmission or reflection rate and a voltage to be applied to liquid crystal in the liquid crystal display device illustrated in FIG. 5A.

FIG. 5B is a graph showing a relation between a voltage to be applied to liquid crystal and a light transmission rate (or a light reflection rate) in the second example.

The first 2nd retardation plate 42, the second 2nd retardation plate 43 and the second polarizer 44 in the second example are designed to have the same retardation and arrangement angles as those of the above-mentioned first example.

The first 1st retardation plate 27 is designed to have retardation deviated from that of the first example by 3 nm at a center thereof in order to compensate for residual retardation by means of the first 1st retardation plate 27. However, it can be considered that the first 1st retardation plate 27 has substantially the same retardation as that of the first example. In contrast, the first 1st retardation plate 27 and the second 1st retardation plate 28 are designed to have arrangement angles different from those of the first example, and the deviation between the arrangement angles of the first and second 2nd retardation plates 42 and 43 is determined to be out of 90 degrees.

As illustrated in FIG. 5A, in the second example, the first polarizer 29 has an absorption axis inclining by −1 degrees relative to the reference direction, and the second polarizer 44 has an absorption axis inclining by 90 degrees relative to the reference direction.

The active matrix substrate 20 has a rubbing angle of 126 degrees, and the opposing substrate 40 has a rubbing angle of 54 degrees.

Similarly to the first example, in the second example, the first 1st retardation plate 27 and the first 2nd retardation plate 42 are comprised of a retardation plate having retardation of about a quarter wavelength ($\lambda/4$), whereas the second 1st retardation plate 28 and the second 2nd retardation plate 43 are comprised of a retardation plate having retardation of about a half wavelength ($\lambda/2$).

The first 1st retardation plate 27 has an arrangement angle of −2.8 degrees. The first 2nd retardation plate 42 corresponding to the first 1st retardation plate 27 has an arrangement angle of 15 degrees. Whereas the arrangement angles between the first 1st retardation plate 27 and the first 2nd retardation plate 42 corresponding to the first 1st retardation plate 27 are deviated from each other by 90 degrees in the above-mentioned first example, deviation in the arrangement angles between the first 1st retardation plate 27 and the first 2nd retardation plate 42 in the second example is not equal to 90 degrees, unlike the first example, because residual retardation is compensated for by the first 1st retardation plate 27.

The second 1st retardation plate 28 has an arrangement angle of 110 degrees, and the second 2nd retardation plate 43 corresponding to the second 1st retardation plate 28 has an arrangement angle of 76 degrees. Hence, a difference in an arrangement angle between the second 1st retardation plate 28 and the second 2nd retardation plate 43 is not equal to 90 degrees.

There was fabricated a liquid crystal display device including the first 1st retardation plate 27, the second 1st retardation plate 28, the first 2nd retardation plate 42 and the second 2nd retardation plate 43 all having the above-mentioned relation with respect to the arrangement angle, and a contrast ratio was measured when images were displayed through transmission lights having passed through the first area A.

The measured contrast ratio was 500.

The measured contrast ratio is an improved one in comparison with a contrast ratio in a conventional liquid crystal display device which contrast ratio is equal to or smaller than 100.

Figure 6A:
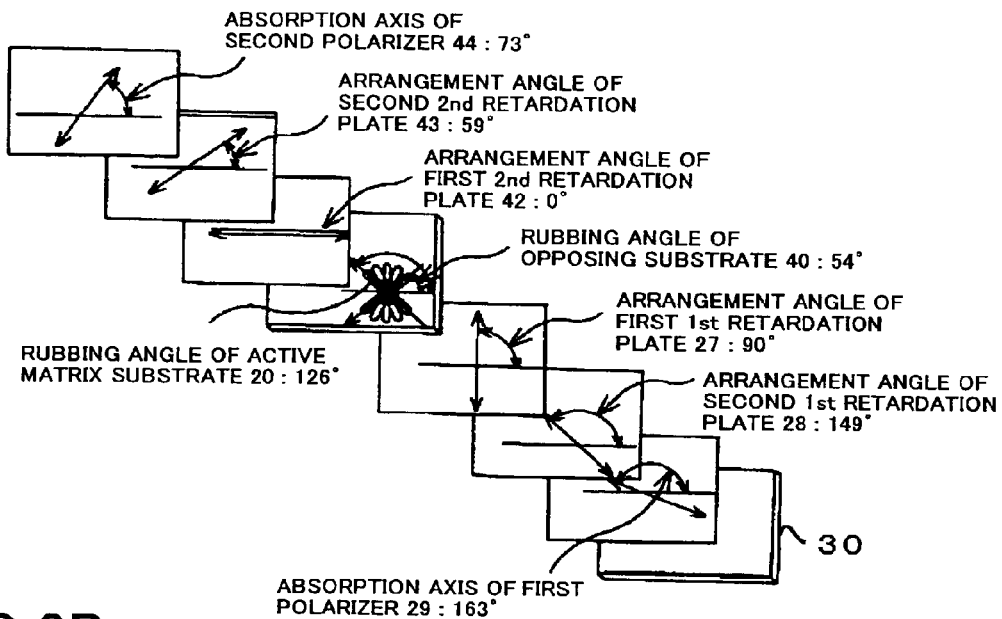
FIG. 6A illustrates a third example of a relation among arrangement angles of the retardation plates in the liquid crystal display device illustrated in FIG. 2.

FIG. 6A illustrates the third example showing a relation between the arrangement angles of the first 1st retardation plate 27 and the first 2nd retardation plate 42 and further between the arrangement angles of the second 1st retardation plate 28 and the second 2nd retardation plate 43.

Figure 6B:
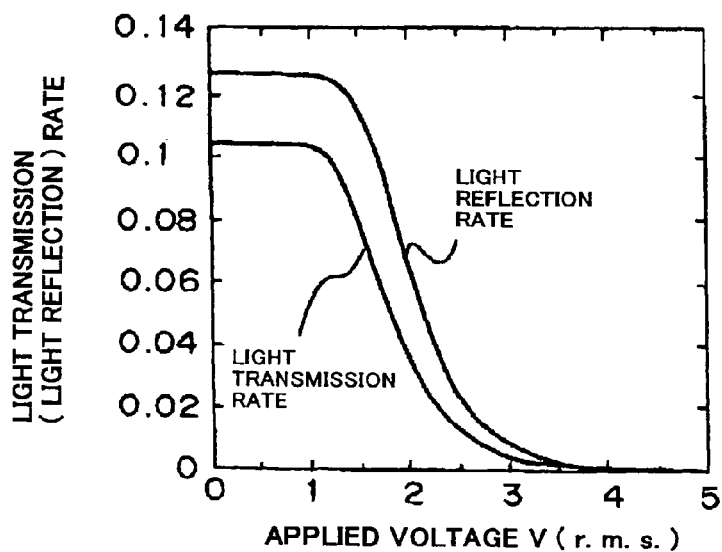
FIG. 6B is a graph showing a relation between a transmission or reflection rate and a voltage to be applied to liquid crystal in the liquid crystal display device illustrated in FIG. 6A.

FIG. 6B is a graph showing a relation between a voltage to be applied to liquid crystal and a light transmission rate (or a light reflection rate) in the third example.

In a first step in the third example, the first 2nd retardation plate 42, the second 2nd retardation plate 43 and the second polarizer 44 are designed to have retardation and arrangement angles such that variance in retardation in the liquid crystal layer 50, caused by variance in a viewing angle, and variance in retardation in retardation films, caused by variance in a viewing angle cancel each other in the second area B. In the third example explained hereinbelow, the liquid crystal display device includes only the second area B, but does not include the first area A.

As illustrated in FIG. 6A, the opposing substrate 40 has a rubbing angle of 54 degrees, and a product Δnd of the liquid crystal layer 50 and a cell gap of the liquid crystal layer 50 is set equal to about 0.27 micrometers. A twisting angle of the liquid crystal layer 50 has an allowable range of about ±4 degrees, and the product Δnd has an allowable range of about ±0.4 micrometers. Accordingly, a twisting angle of the liquid crystal layer 50 may be determined in the range of 66 to 74 degrees, and the product Δnd of the liquid crystal layer 50 may be determined in the range of 0.21 to 0.31 micrometers.

The first 2nd retardation plate 42, the second 2nd retardation plate 43 and the second polarizer 44 are arranged in this order on the second transparent substrate 41 at the opposite side of the liquid crystal layer 50. The first 2nd retardation plate 42 is designed to have retardation in the range of 145 nm to 180 nm relative to a monochromatic light having a wavelength of 550 nm, and the second 2nd retardation plate 43 is designed to have retardation in the range of 250 nm to 300 nm relative to the same.

As illustrated in FIG. 6A, alignment of liquid crystal in the liquid crystal layer 50 is determined in dependence on a direction in which alignment films of both the opposing substrate 40 and the active matrix substrate 20 are aligned. Specifically, liquid crystal in the liquid crystal layer 50 is aligned in such a way that the liquid crystal is continuously twisted from an interface of the opposing substrate 40 towards an interface of the active matrix substrate 20.

The first 2nd retardation plate 42, the second 2nd retardation plate 43 and the second polarizer 44 are designed to have such polarized absorption axes that they have arrangement angles of $\alpha$, $\beta$ and $\gamma$, respectively, assuming that a direction perpendicular to a first direction in which liquid crystal molecules in the liquid crystal layer 50 at a middle in a thicknesswise direction of the liquid crystal layer 50 are aligned, which first direction is a direction bisecting a direction in which liquid crystal molecules are aligned in the vicinity of the opposing substrate 40 and a direction in which liquid crystal molecules are aligned in the vicinity of the active matrix substrate 20, is selected as a reference direction, and a direction in which liquid crystal is twisted from the opposing substrate 40 towards the active matrix substrate 20 is a positive direction.

In the third example, the arrangement angle α is designed to be in the range of −15 to 15 degrees, the arrangement angle β is designed to be in the range of 45 to 75 degrees, and the arrangement angle γ is designed to be in the range of 60 to 90 degrees, for avoiding images from being colored due to variance in a viewing angle.

The liquid crystal display device in accordance with the third example acts as a normally white device exhibiting bright condition, in the second area B, when no voltage is applied to liquid crystal. A light entering the liquid crystal display device is converted into a circularly polarized light or a almost circularly polarized light while it passes through the second polarizer 44, the second 2nd retardation plate 43 and the first 2nd retardation plate 42, and then, enters the liquid crystal layer 50. By applying an electric field to the liquid crystal layer 50 through a common transparent electrode (not illustrated) of the opposing electrode 40, it is possible to vary alignment of liquid crystal in the liquid crystal layer 50 for causing an incident light to be reflected at the light-reflection electrode 25 in different manners, resulting in that an intensity of a light reaching a user is varied, and hence, desired images are displayed on a liquid crystal panel.

In the first embodiment, the first 2nd retardation plate 42 and the second 2nd retardation plate 43 may be composed of polycarbonate family high polymer, polysulfone family high polymer, norbornene family high polymer or polyvinyl alcohol family high polymer.

As mentioned above, the second area B in the liquid crystal display device in accordance with the first embodiment makes it possible to display full-colored images without unevenness which images are bright, have a high contrast ratio, and do not become yellowish, even if a viewing angle is varied in bright display condition.

In the second step in the third example, the first 1st retardation plate 27 is designed to have retardation in the range of 125 to 155 nm in order to cause the first 1st retardation plate 27 to compensate for residual retardation in the first area A. The second 1st retardation plate 28 is designed to have the same retardation as that of the second 2nd retardation plate 43. The first 1st retardation plate 27, the second 1st retardation plate 28 and the first polarizer 29 are designed to have arrangement angles which are deviated by 90 degrees from arrangement angles of the corresponding first 2nd retardation plate 42, the second 2nd retardation plate 43 and the second polarizer 44, respectively.

As illustrated in FIG. 6A, in the third example, the first polarizer 29 has an absorption axis inclining by 163 degrees relative to the reference direction, and the second polarizer 44 has an absorption axis inclining by 73 degrees relative to the reference direction.

The active matrix substrate 20 has a rubbing angle of 126 degrees, and the opposing substrate 40 has a rubbing angle of 54 degrees.

Similarly to the above-mentioned first and second examples, in the first example, the first 1st retardation plate 27 and the first 2nd retardation plate 42 are comprised of a retardation plate having retardation of about a quarter wavelength (λ/4), whereas the second 1st retardation plate 28 and the second 2nd retardation plate 43 are comprised of a retardation plate having retardation of about a half wavelength (λ/2).

The first 1st retardation plate 27 has an arrangement angle of 90 degrees. The first 2nd retardation plate 42 corresponding to the first 1st retardation plate 27 has an arrangement angle of 0 degrees. Thus, the arrangement angles between the first 1st retardation plate 27 and the first 2nd retardation plate 42 are deviated from each other by 90 degrees.

The second 1st retardation plate 28 has an arrangement angle of 149 degrees. The second 2nd retardation plate 43 corresponding to the second 1st retardation plate 28 has an arrangement angle of 59 degrees. Thus, the arrangement angles between the second 1st retardation plate 28 and the second 2nd retardation plate 43 are deviated from each other by about 90 degrees.

There was fabricated a liquid crystal display device including the first 1st retardation plate 27, the second 1st retardation plate 28, the first 2nd retardation plate 42 and the second 2nd retardation plate 43 all having the above-mentioned relation with respect to the arrangement angle, and a contrast ratio was measured when images were displayed through transmission lights having passed through the first area A.

The measured contrast ratio was 800.

The measured contrast ratio is significantly improved in comparison with a contrast ratio in a conventional liquid crystal display device which contrast ratio is equal to or smaller than 100.

Whereas the residual retardation is compensated for by the first 1st retardation plate 27 of the active matrix substrate 20 in the second example, the residual retardation is compensated for by the first 2nd retardation plate 42 of the opposing substrate 40 in the third example. Thus, the residual retardation may be compensated for by either the first 1st retardation plate 27 or the first 2nd retardation plate 42. As an alternative, the residual retardation may be compensated for both of the first 1st retardation plate 27 and the first 2nd retardation plate 42.

Figure 7A:
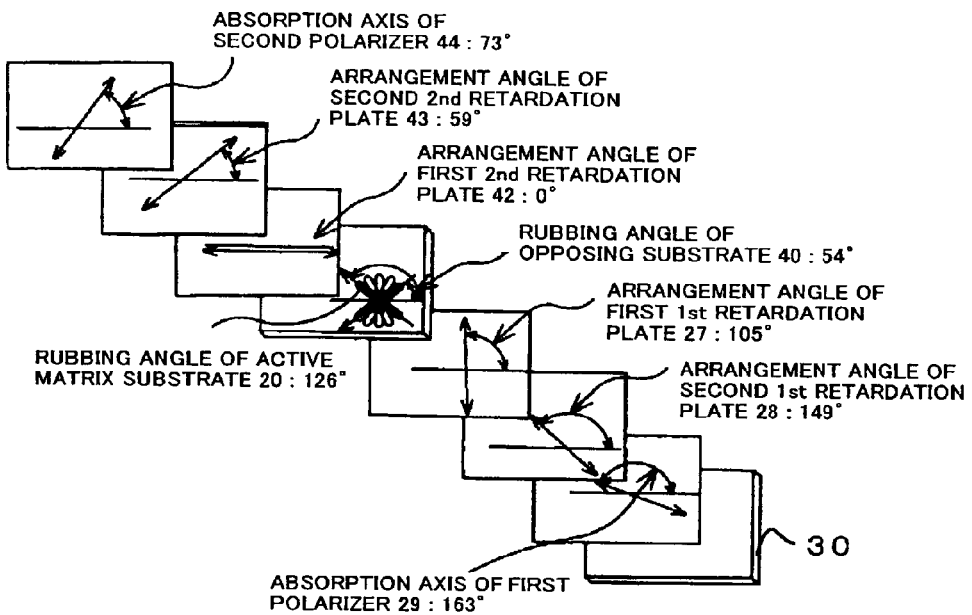
FIG. 7A illustrates a fourth example of a relation among arrangement angles of the retardation plates in the liquid crystal display device illustrated in FIG. 2.

FIG. 7A illustrates the fourth example showing a relation between the arrangement angles of the first 1st retardation plate 27 and the first 2nd retardation plate 42 and further between the arrangement angles of the second 1st retardation plate 28 and the second 2nd retardation plate 43.

Figure 7B:
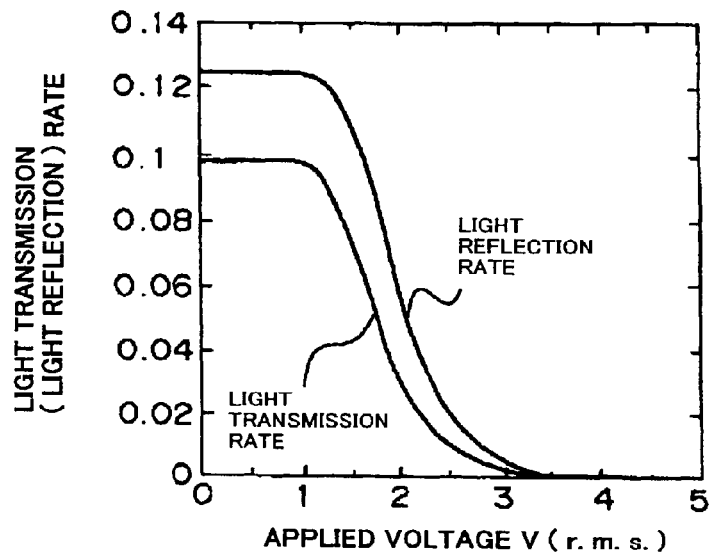
FIG. 7B is a graph showing a relation between a transmission or reflection rate and a voltage to be applied to liquid crystal in the liquid crystal display device illustrated in FIG. 7A.

FIG. 7B is a graph showing a relation between a voltage to be applied to liquid crystal and a light transmission rate (or a light reflection rate) in the fourth example.

The second 1st retardation plate 28 and the first polarizer 29 are designed to have the same retardation and arrangement angles as those of the third example.

The first 2nd retardation plate 42 is designed to have retardation deviated from that of the third example by 6 nm at a center thereof in order to compensate for residual retardation by means of the first 2nd retardation plate 42. However, it can be considered that the first 2nd retardation plate 42 has substantially the same retardation as that of the third example. In contrast, the first 1st retardation plate 27 are designed to have arrangement angles different from that of the third example, and the deviation in the arrangement angle between the first 1st retardation plate 27 and the first 2nd retardation plate 42 corresponding to the first 1st retardation plate 27 is determined to be out of 90 degrees.

As illustrated in FIG. 7A, in the fourth example, the first polarizer 29 has an absorption axis inclining by 163 degrees relative to the reference direction, and the second polarizer 44 has an absorption axis inclining by 73 degrees relative to the reference direction.

The active matrix substrate 20 has a rubbing angle of 126 degrees, and the opposing substrate 40 has a rubbing angle of 54 degrees.

Similarly to the first to third examples, in the fourth example, the first 1st retardation plate 27 and the first 2nd retardation plate 42 are comprised of a retardation plate having retardation of about a quarter wavelength (λ/4), whereas the second 1st retardation plate 28 and the second 2nd retardation plate 43 are comprised of a retardation plate having retardation of about a half wavelength ($\lambda/2$).

The first 1st retardation plate 27 has an arrangement angle of 105 degrees. The first 2nd retardation plate 42 corresponding to the first 1st retardation plate 27 has an arrangement angle of 0 degrees. Thus, the arrangement angles between the first 1st retardation plate 27 and the first 2nd retardation plate 42 are deviated from each other by 90 degrees.

The second 1st retardation plate 28 has an arrangement angle of 149 degrees, and the second 2nd retardation plate 43 corresponding to the second 1st retardation plate 28 has an arrangement angle of 59 degrees. Thus, the arrangement angles between the second 1st retardation plate 28 and the second 2nd retardation plate 43 are deviated from each other by 90 degrees.

There was fabricated a liquid crystal display device including the first 1st retardation plate 27, the second 1st retardation plate 28, the first 2nd retardation plate 42 and the second 2nd retardation plate 43 all having the above-mentioned relation with respect to the arrangement angle, and a contrast ratio was measured when images were displayed through transmission lights having passed through the first area A.

The measured contrast ratio was 330.

The measured contrast ratio is an improved one in comparison with a contrast ratio in a conventional liquid crystal display device which contrast ratio is equal to or smaller than 100.

Whereas the residual retardation is compensated for by the first 1st retardation plate 27 of the active matrix substrate 20 in the second example, the residual retardation is compensated for by the first 2nd retardation plate 42 of the opposing substrate 40 in the fourth example, similarly to the third example.

As having been explained in the first to fourth examples, it would be possible to significantly improve a contrast ratio obtained when images are displayed through transmission lights passing through the first area A, in comparison with a conventional liquid crystal display device, by designing the first 1st retardation plate 27, the second 1st retardation plate 28, the first 2nd retardation plate 42 and the second 2nd retardation plate 43 to have a relation as defined in any one of the above-mentioned first to fourth examples with respect to the arrangement angles, namely, such a relation that arrangement angles between the corresponding retardation plates are deviated from each other by 90 degrees.

Though both the active matrix substrate 20 and the opposing substrate 40 are designed to have two retardation plates in the first to fourth examples, the number of retardation plates is not to be limited to two (2). The active matrix substrate 20 and the opposing substrate 40 may be designed to have one or three or more retardation plates.

In the liquid crystal display device 10 in accordance with the first embodiment, a cell gap in the second area B, that is, a thickness Dr of the liquid crystal layer 50 is designed longer than a cell gap in the first area A, that is, a thickness Df of the liquid crystal layer 50.

Since the light-reflection electrode 25 has raised and recessed portions in the second area B, a cell gap Dr in the second area B is defined as an average in optical lengths in the second area B.

By designing the cell gap Dr longer than the cell gap Df, it would be possible to improve white color temperature for displayed images in the liquid crystal display device 10. In a light transmission and reflection type liquid crystal display device, the cell gap Dr is selected such that a luminance in the second area B is maximized. Hence, by designing the cell gap Df in the first area A to be equal to the cell gap Dr, a luminance in the first area A can be also maximized.

Figure 8A:
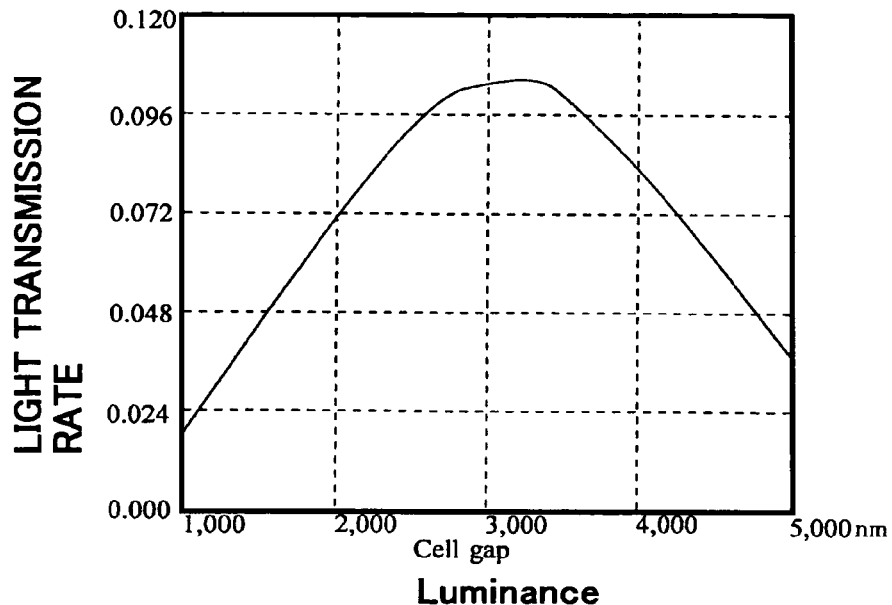
FIGS. 8A and 8B are graphs showing the results of simulating a relation between a cell gap and a transmission rate.

FIG. 8A shows the results of simulating a relation between a cell gap and a light transmission rate. As is readily understood in view of FIG. 8A, a luminance is in maximum when a cell gap is equal to 3.2 micrometers. However, since there is a jump in V-T (applied voltage vs. light transmission rate) characteristic, it is preferable that a cell gap is designed equal to 3 micrometers. Hence, a cell gap in the first area A in the first embodiment is designed equal to 3 micrometers.

Figure 8B:
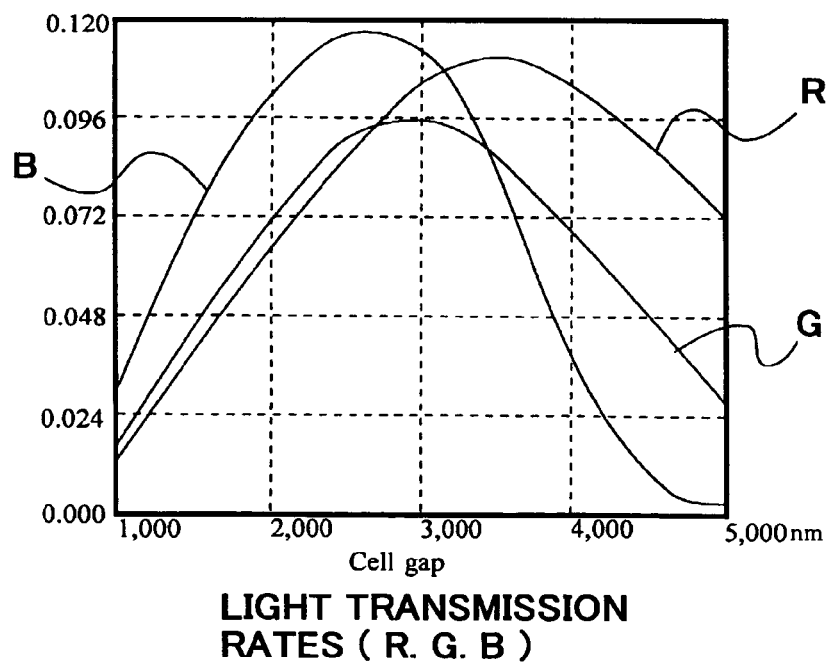

FIG. 8B shows the results of simulating a relation between a cell gap and light transmission rates for red, green and blue. It is understood in view of FIG. 8B that a luminance for blue is enhanced, if the cell gap Df in the first area A is designed smaller than 3 micrometers. That is, by designing the cell gap Df smaller than a cell gap at which a luminance is maximized, it would be possible to raise a color temperature for white.

Since the light-reflection electrode 25 has raised and recessed portions in the second area B, the cell gap Dr in the second area B is determined as an average of optical lengths in the second area B. When spherical micro-pearls are introduced into the liquid crystal layer 50 for ensuring a cell gap, such micro-pearls have a diameter smaller than a height of the raised and recessed portions of the light-reflection electrode 25, and hence, it would be impossible to control a cell gap in the second area B by means of such micro-pearls. In contrast, since the transparent electrode 26 has a flat surface, it is possible to control a cell gap in the first area A by means of such micro-pearls.

The cell gap Dr may be designed to be equal to or almost equal to the cell gap Df. As mentioned earlier, the cell gap Dr is determined usually such that a luminance in the second area B is in maximum. Hence, by designing the cell gap Df in the first area A to be equal to the cell gap Dr, it would be possible to maximize a luminance in the first area A, in which case, the cell gap Df would be readily controlled, because the transparent electrode 26 is planarized at a surface in the first area A.

FIGS. 9A to 9G are cross-sectional views of the active matrix substrate 20 in the liquid crystal display device 10. A method of fabricating the active matrix substrate 20 in the liquid crystal display device 10 is explained hereinbelow with reference to FIGS. 9A to 9G.

Figure 9A:
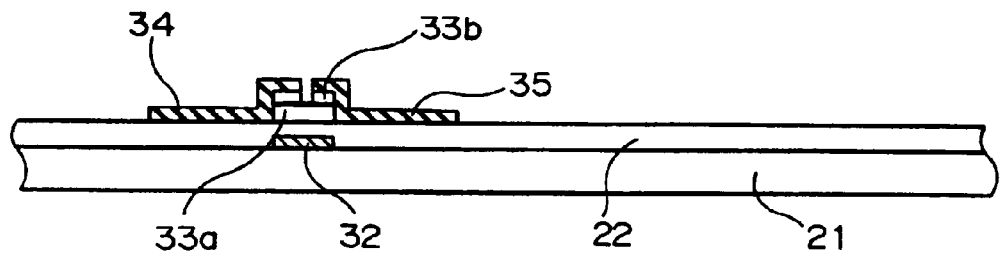
FIGS. 9A to 9G are cross-sectional views of the liquid crystal display device illustrated in FIG. 2, illustrating respective steps of a method of fabricating the same.

First, as illustrated in FIG. 9A, a chromium (Cr) film is formed on the first transparent substrate 21 composed of glass, by sputtering.

Then, the chromium film is patterned by photolithography and dry etching to thereby form the gate line 1 (see FIG. 3) and the gate electrode 32.

In place of the chromium film, there may be formed a film composed of metal having a low resistance and being able to be readily patterned by photolithography and etching, such as a molybdenum film, a titanium film, an aluminum film, or an aluminum alloy film. As an alternative, a multi-layered film may be formed in place of the chromium film, such as a film including an aluminum film and a barrier metal, such as a titanium film, formed on the aluminum film.

Then, a silicon nitride film is formed all over the first transparent substrate 21 and the gate electrode 32 by chemical vapor deposition (CVD).

Then, a non-doped amorphous silicon film and an n+ doped amorphous silicon film are formed on the gate insulating film 22 by CVD, and subsequently, are patterned into the a-Si layer 33a and the n+ a-Si layer 33b. The a-Si layer 33a acts as an active layer in the thin film transistor 31, and the n+ a-Si layer 33b ensures ohmic contact between the a-Si layer 33a and both of the drain electrode 34 and the source electrode 35.

A chromium film is formed over the a-Si layer 33a and the n+ a-Si layer 33b by sputtering, and then, is patterned into the drain electrode 34 and the source electrode 35.

Then, the n+ a-Si layer 33b is dry-etched through the use of etching gas to thereby partially remove the n+ a-Si layer 33b only in a portion sandwiched between the drain electrode 34 and the source electrode 35. This is because to prevent a current from running directly across the drain electrode 34 and the source electrode 35 through the n+ a-Si layer 33b.

Then, a silicon nitride film is formed over the first transparent film 21 by CVD, and then, is patterned into a passivation film (not illustrated). The passivation film prevents impurities such as ions from diffusing into the a-Si layer 33 to thereby avoid malfunction of the thin film transistor 31.

By carrying out the above-mentioned steps, the thin film transistor 31 is formed on the first transparent substrate 21.

Figure 9B:
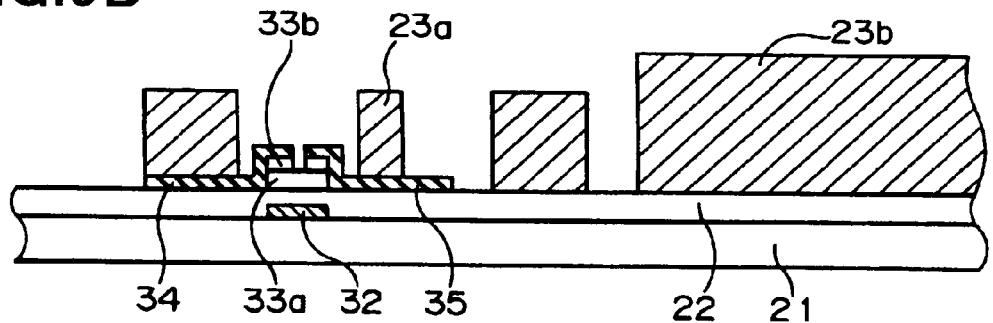

Then, as illustrated in FIG. 9B, a first electrically insulating film 23a is formed in the second area B, and a first electrically insulating film 23b higher than the first electrically insulating film 23a is formed in the first area A, in order to form the light-reflection electrode with raised and recessed portions.

Figure 9C:
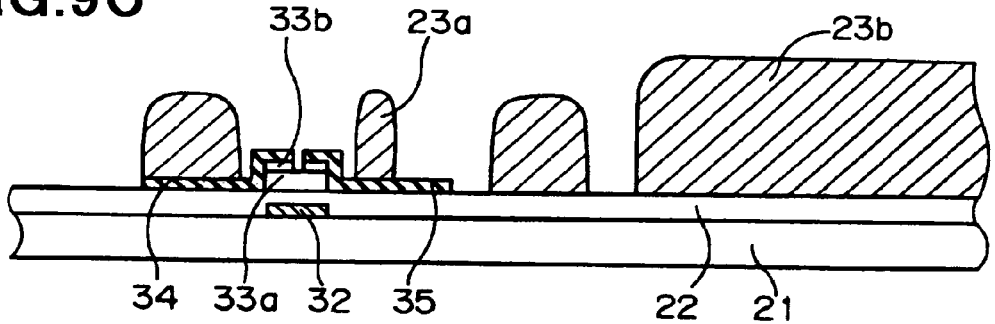

Then, as illustrated in FIG. 9C, the first electrically insulating films 23a and 23b are rounded at their corners to thereby smooth their summits.

Figure 9D:
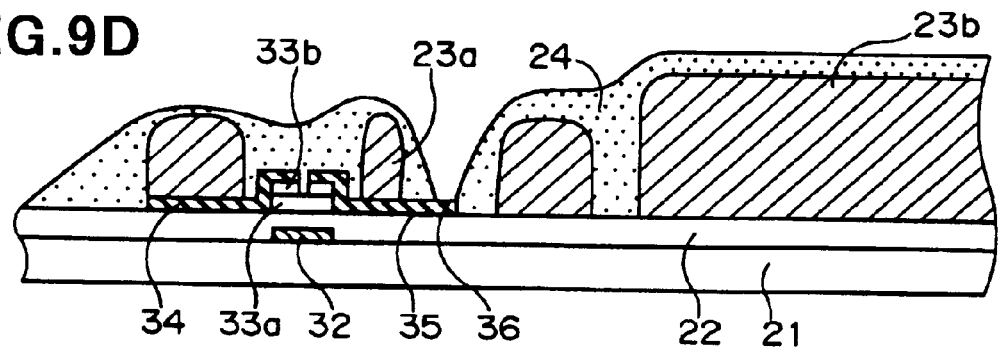

Then, as illustrated in FIG. 9D, a second electrically insulating film 24 is formed covering the first electrically insulating films 23a and 23b therewith, and a contact hole 36 is formed throughout the second electrically insulating film 24 in order to electrically connect the light-reflection electrode 25 and the source electrode 35 to each other.

The first electrically insulating films 23a and 23b and the second electrically insulating film 24 are formed entirely covering a display area therewith, and the second electrically insulating film 24 is formed extending beyond the first electrically insulating film 23a in an area (left-side area in FIG. 9D) outside a pixel located at an outermost boundary of the display area, in order to prevent the first electrically insulating film 23a and the second electrically insulating film 24 from forming steep steps.

The first electrically insulating films 23a and 23b may be composed of photosensitive resin or non-photosensitive resin.

When the first electrically insulating films 23a and 23b are composed of non-photosensitive resin, the first electrically insulating films 23a and 23b are formed by the steps of forming a non-photosensitive resin film, forming a resist to be used for patterning the non-photosensitive resin, exposing the resist to a light, developing the resist, etching the first electrically insulating films 23a and 23b through the use of the resist as a mask, and removing the resist.

When the first electrically insulating films 23a and 23b are composed of photosensitive resin, the first electrically insulating films 23a and 23b are formed by the steps of forming a photosensitive resin film, exposing the photosensitive resin film to a light, and developing the photosensitive resin film. By composing the first electrically insulating films 23a and 23b of photosensitive resin, it is possible to omit the steps of forming a resist and removing a resist.

In FIG. 9C, the patterned first electrically insulating films 23a and 23b are annealed at a temperature in the range of 80 to 300 degrees centigrade to thereby melt surfaces of the first electrically insulating films 23a and 23b for rounding them at their corners. In place of annealing the first electrically insulating films 23a and 23b, the first electrically insulating films 23a and 23b may be subject to other processes such as chemical process for rounding them at their corners. If the second electrically insulating film 24 ensures a sufficiently smooth and rounded surface, it is not necessary to apply a particular process to the first electrically insulating films 23a and 23b for rounding them at their corners.

In the first embodiment, the first electrically insulating films 23a and 23b and the second electrically insulating film 24 are comprised of a polyimide film. However, it is not always necessary to compose the first embodiment, the first electrically insulating films 23a and 23b and the second electrically insulating film 24 of the same organic resin. They may be composed of different resins from each other.

In addition, they may be composed of a resin other than polyimide. For instance, they may be composed of a plurality of resins in combination, such as a combination of acrylic resin and polyimide resin, a combination of a silicon nitride film and acrylic resin, or a combination of a silicon oxide film and polyimide resin.

Figure 9E:
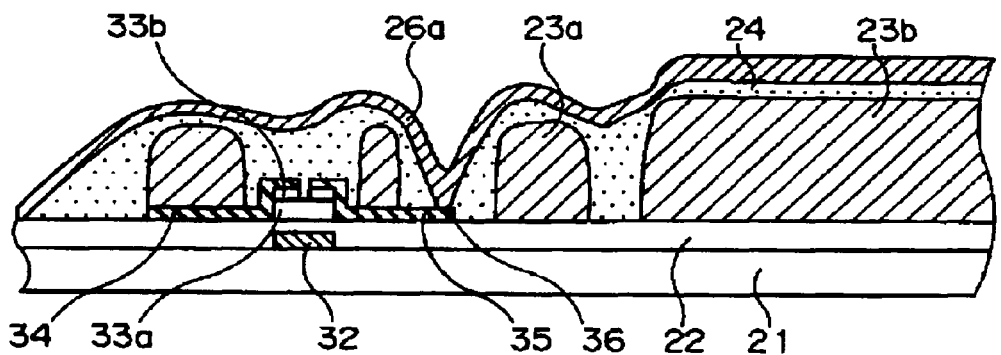

Then, as illustrated in FIG. 9E, a transparent film 26a composed of transparent material such as indium tin oxide (ITO) is formed all over the resultant illustrated in FIG. 9D. Then, a resist film (not illustrated) is formed covering the transparent film 26a therewith, and thereafter, is patterned into a such a pattern that only a region in which the transparent electrode 26 is to be formed is covered therewith.

Then, the transparent film 26a is etched through the use of the patterned resist film as a mask. Then, the patterned resist film is removed. As a result, the transparent electrode 26 is formed, as illustrated in FIG. 9F.

Figure 9F:
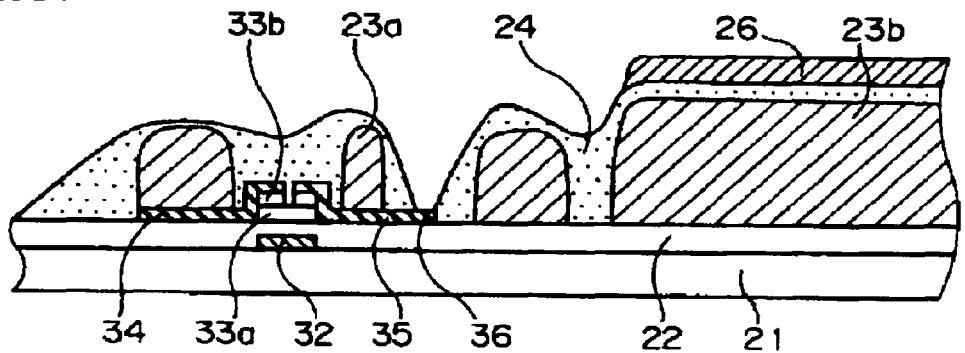

Then, a molybdenum film 25a and an aluminum film 25b are successively formed all over the resultant illustrated in FIG. 9F. Then, a resist film (not illustrated) is formed covering the aluminum film 25a therewith, and thereafter, is patterned into a such a pattern that only a region in which the light-reflection electrode 25 is to be formed is covered therewith.

Then, the molybdenum film 25a and the aluminum film 25b are etched through the use of the patterned resist film as a mask. Then, the patterned resist film is removed. As a result, the light-reflection electrode 25 comprised of the underlying molybdenum film 25a and the overlying aluminum film 25b is formed, as illustrated in FIG. 9G.

Figure 9G:
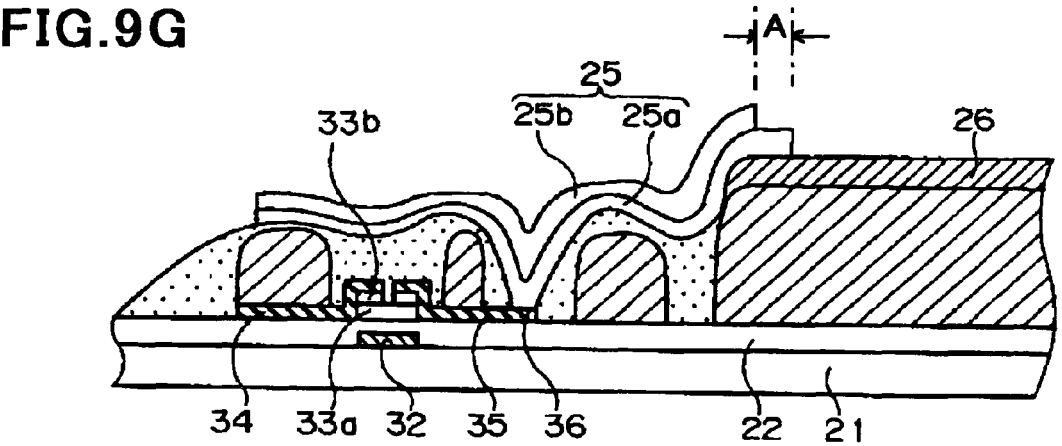

As illustrated in FIG. 9G, the aluminum film 25b is electrically connected to the transparent electrode 26 by forming the molybdenum film 25a partially overlapping the transparent electrode 26 at an end thereof, and further forming the aluminum film 25b on the molybdenum film 25a. The reason of forming the molybdenum film 25a through which the aluminum film 25b is electrically connected to the transparent electrode 26 is to prevent the battery effect.

In order to surely prevent the battery effect, as illustrated in FIG. 9G, the aluminum film 25b is formed shorter than the molybdenum film 25a by a length A. Specifically, an end of the aluminum film 25b located above the transparent electrode 26 is located closer to the thin film transistor 31 than an end of the molybdenum film 25a by a length A. It is preferable that the length A is equal to or longer than 1 micrometer.

It is preferable that the underlying molybdenum film 25a has a thickness in the range of 100 to 3000 angstroms both inclusive, and the aluminum film 25b has a thickness in the range of 500 to 5000 angstroms both inclusive. If the aluminum film 25b has a thickness smaller than 500 angstroms, the aluminum film would be a half light-permeable film, that is, the aluminum film would not act as a light-reflection film. On the other hand, if the aluminum film 25b has a thickness greater than 5000 angstroms, the aluminum film would be whitish at a surface thereof, resulting in that a reflection rate of the aluminum film is reduced, and hence, the aluminum film does not act as a light-reflection film. The molybdenum film 25a preferably has a thickness equal to or greater than 100 angstroms in order to surely ensure the battery effect.

In place of the molybdenum film 25a, a chromium film, a titanium film, or a tantalum film may be used as an underlying film. When the second electrically insulating film 24 is to be composed of organic resin, it would be possible to increase adhesion between the first electrically insulating film 24 and the underlying film 25a by composing the underlying film 25a of chromium, titanium or tantalum.

By carrying out the above-mentioned steps, the active matrix substrate 20 in the liquid crystal display device 10 in accordance with the first embodiment is fabricated.

The liquid crystal display device 10 in accordance with the first embodiment may be applied to an electronic device. Hereinbelow, some examples are explained.

Figure 10:
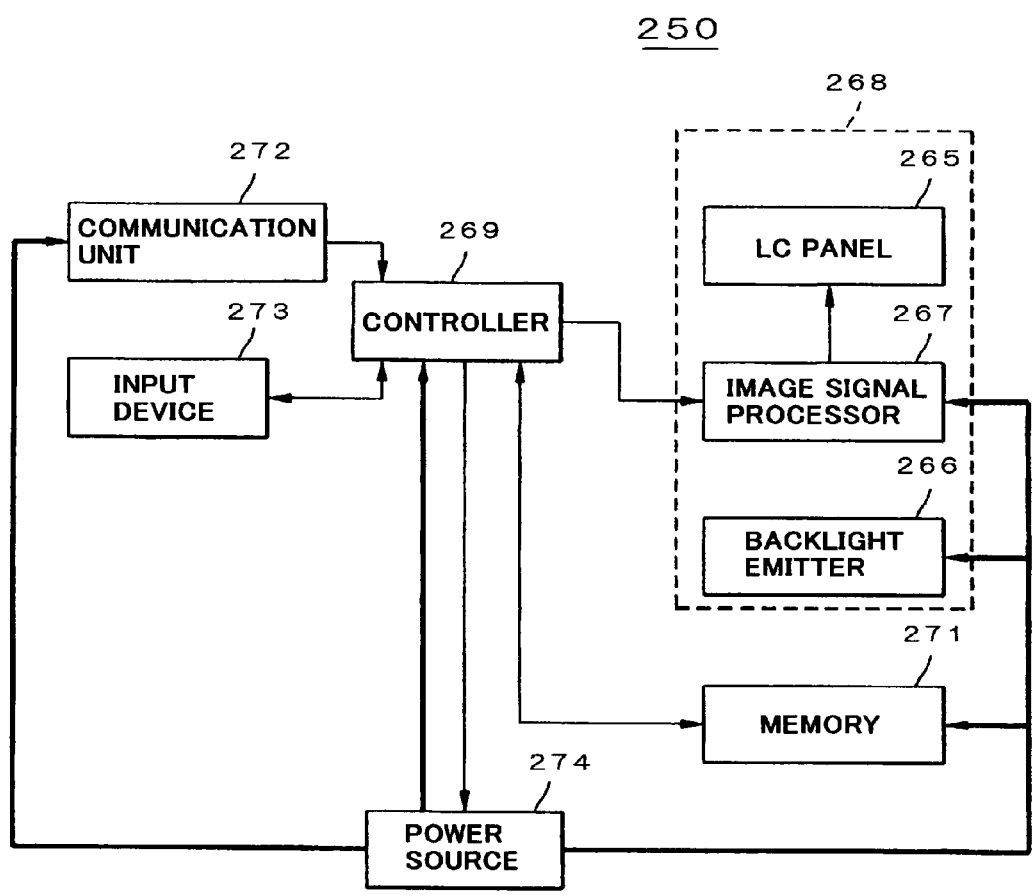
FIG. 10 is a block diagram of a first example of an electronic device to which the liquid crystal display device in accordance with the first embodiment is applied.

FIG. 10 is a block diagram of a portable communication device 250 to which the liquid crystal display device 10 is applied. In the portable communication device 250, the liquid crystal display device 10 in accordance with the first embodiment is used as a part of a later mentioned liquid crystal panel 265.

The portable communication terminal 250 is comprised of a display unit 268 including a liquid crystal panel 265, a backlight emitter 266, and an image signal processor 267, a controller 269 controlling operation of the parts constituting the portable communication terminal 250, a memory 271 storing a program to be executed by the controller 269 and various data, a communication unit 272 which makes data communication, an input device 273 comprised of a keyboard or a pointer, and a power source 274 supplying power to the above-mentioned parts constituting the portable communication terminal 250.

The liquid crystal panel 265 including the liquid crystal display device 10 in accordance with the first embodiment enhances an aperture ratio in the display unit 268, and further enhances a luminance in the display unit 268.

The liquid crystal panel 265 including the liquid crystal display device 10 may be applied to a monitor of a portable personal computer, a note type personal computer, or a desktop type personal computer.

Figure 11:
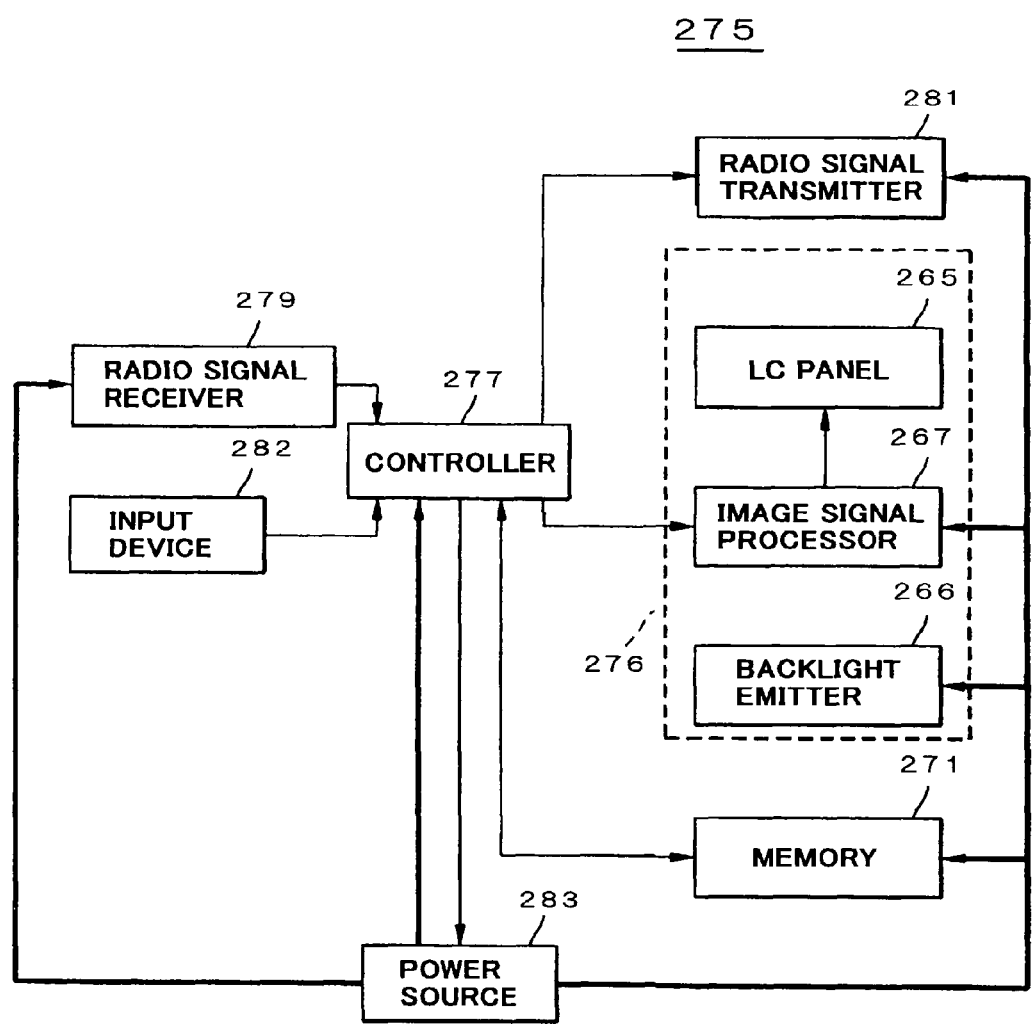
FIG. 11 is a block diagram of a second example of an electronic device to which the liquid crystal display device in accordance with the first embodiment is applied.

FIG. 11 is a block diagram of a cellular phone 275 to which the liquid crystal display device 10 is applied.

The cellular phone 275 is comprised of a display unit 276 including a liquid crystal panel 265, a backlight emitter 266, and an image signal processor 267, a controller 277 controlling operation of the parts constituting the cellular phone 275, a memory 278 storing a program to be executed by the controller 277 and various data, a radio signal receiver 279, a radio signal transmitter 281, an input device 282 comprised of a keyboard or a pointer, and a power source 283 supplying power to the above-mentioned parts constituting the cellular phone 275.

The liquid crystal panel 265 including the liquid crystal display device 10 in accordance with the first embodiment enhances an aperture ratio in the display unit 276, and further enhances a luminance in the display unit 276.

In the above-mentioned first embodiment, the parts by which the present invention is characterized are intensively explained, and parts known to those skilled in the art are not explained in detail. However, it should be noted that the latter could be readily understood to those skilled in the art without detailed explanation.

Though the first transparent substrate 21, the first 1st retardation plate 27, the second 1st retardation plate 28, the first polarizer 29 and the backlight source 30 are illustrated to make contact with adjacent parts in the above-mentioned first embodiment, it is not always necessary for them to make contact with adjacent parts. One or more of them may be arranged independently of others or one another.

The same can be applied to the second transparent substrate 41, the first 2nd retardation plate 42, the second 2nd retardation plate 43 and the second polarizer 44.

The liquid crystal display device 10 in accordance with the first embodiment is designed to include two retardation plates each above and below the liquid crystal layer 50. However, the number of the retardation plates is not to be limited to two (2). The liquid crystal display device 10 may be designed to include N retardation plates each above and below the liquid crystal layer 50, wherein N is an integer equal to or greater than one (1).

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-132744 filed on Apr. 27, 2001 including specification, claims, drawings and summary is incorporated herein by reference in its entirety.

What is claimed is:

1. A liquid crystal display device comprising:
   (a) a first transparent substrate;
   (b) a second substrate spaced away from and facing said first transparent substrate; and
   (c) a liquid crystal layer sandwiched between said first transparent substrate and said second substrate,
   wherein said first transparent substrate has a first area through which a light is allowed to pass and a second area in which a light is reflected,
   a reflection electrode is formed in said second area, said reflection electrode being comprised of an underlying film formed on an electrically insulating film and composed of one of molybdenum, chromium, titanium and tantalum, and an overlying film formed on said underlying film and composed of one of aluminum and silver,
   a transmission electrode is formed on said electrically insulating film in said first area,
   an end part of said reflection electrode partially overlaps an end part of said transmission electrode such that said reflection electrode is located on said transmission electrode,
   said electrically insulating film is an organic film,
   said underlying film has a thickness in the range of 100 to 3000 angstroms,
   said overlying film has a thickness in the range of 500 to 5000 angstroms,
   said overlying film is not located on an edge of the underlying film on the transmission electrode, and
   a distance between an edge of the overlying film and the edge of the underlying film in a direction parallel to the first transparent substrate is equal to or greater than 1.0 micrometers.

2. The liquid crystal display device as set forth in claim 1, wherein said electrically insulating film formed in said second area is formed at a surface thereof with raised and recessed portions.

3. The liquid crystal display device as set forth in claim 1, wherein said electrically insulating film formed in first area has a planarized surface.

4. The liquid crystal display device as set forth in claim 1, wherein a thickness of said liquid crystal layer in said first area is almost equal to a thickness of said liquid crystal layer in said second area.

5. The liquid crystal display device as set forth in claim 1, wherein a thickness of said liquid crystal layer in said first area is smaller than a thickness of said liquid crystal layer in said second area.

* * * * *